United States Patent
Park

(10) Patent No.: US 7,123,283 B2
(45) Date of Patent: Oct. 17, 2006

(54) VIDEO OVERLAY DEVICE OF MOBILE TELECOMMUNICATION TERMINAL

(75) Inventor: Woo Seog Park, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 184 days.

(21) Appl. No.: 10/733,988

(22) Filed: Dec. 10, 2003

(65) Prior Publication Data

US 2004/0127156 A1  Jul. 1, 2004

(30) Foreign Application Priority Data

Dec. 10, 2002  (KR) .................... 10-2002-0078469

(51) Int. Cl.
*H04N 7/14*  (2006.01)
(52) U.S. Cl. .............. 348/14.02; 348/14.01; 345/604; 455/566
(58) Field of Classification Search .. 348/14.01–14.09, 348/14.1, 14.11, 14.12, 14.13; 345/603, 345/604; 455/550.1, 556.1, 586.2, 566
See application file for complete search history.

(56) References Cited

U.S. PATENT DOCUMENTS 5,272,468 A * 12/1993 Read .................... 345/604
5,426,460 A    6/1995 Erving et al.
6,094,213 A    7/2000 Mun et al.
6,243,129 B1   6/2001 Deierling
2003/0020735 A1 * 1/2003 Lee ...................... 345/690

FOREIGN PATENT DOCUMENTS

| CN | 115130 A |   | 7/1997 |
| GB | 2313251 A | * | 11/1997 |
| JP | 403123152 A | * | 5/1991 |
| JP | 08-037655 | * | 6/1996 |
| JP | 09-149333 | * | 6/1997 |
| JP | 02001111875 A | * | 4/2001 |
| JP | 2002-290940 | * | 10/2002 |
| KR | 1020010093895 A |   | 10/2001 |
| WO | WO 9726744 |   | 7/1997 |

* cited by examiner

*Primary Examiner*—Melur Ramakrishnaiah
(74) *Attorney, Agent, or Firm*—Lee, Hong, Degerman, Kand & Schmadeka

(57) ABSTRACT

A video overlay device of a mobile telecommunication terminal comprises a multiplexer for outputting at least one of a first video data and a second video data; and a video overlay unit for overlaying at least one of the first and second video data with graphic data in accordance with a predetermined ratio. The multiplexer selectively outputs at least one of the first and second video data based on input video selection signals provided by a central processing unit (CPU).

18 Claims, 5 Drawing Sheets

| VID_SEL(0:1) | | OUTPUT SIGNALS |
| --- | --- | --- |
| VID_SE | VID_SEL1 | |
| 0 | 0 | GRAPHICS DATA |
| 0 | 1 | MPEG VIDEO DATA |
| 1 | 0 | BLENDING DATA(FROM COLOR PALETTE) |
| 1 | 1 | DISABLE OUTPUT |

FIG. 6

| BLENDING LEVEL | B_L DATA[0:3] 0 1 2 3 | GRAPHICS DATA | MPEG VIDEO DATA |
|---|---|---|---|
| 1 | 0 0 0 0 | 100% | 100% |
| 2 | 0 0 0 1 | 100% | 75% |
| 3 | 0 0 1 0 | 100% | 50% |
| 4 | 0 0 1 1 | 100% | 25% |
| 5 | 0 1 0 0 | 100% | 0% |
| 6 | 0 1 0 1 | 0% | 100% |
| 7 | 0 1 1 0 | 25% | 100% |
| 8 | 0 1 1 1 | 50% | 100% |
| 9 | 1 0 0 0 | 75% | 100% |
| 10 | 1 0 0 1 | 0% | 0% |
| 11 | 1 0 1 0 | 25% | 75% |
| 12 | 1 0 1 1 | 75% | 25% |
| 13 | 1 1 0 0 | 50% | 50% |
| 14 | 1 1 0 1 | RESERVED | RESERVED |
| 15 | 1 1 1 0 | RESERVED | RESERVED |
| 16 | 1 1 1 1 | RESERVED | RESERVED |

VIDEO OVERLAY DEVICE OF MOBILE TELECOMMUNICATION TERMINAL

CROSS-REFERENCE TO RELATED APPLICATION

Pursuant to 35 U.S.C. § 119(a), this application claims the benefit of earlier filing date and right of priority to Korean Patent Application No. 2002-78469, filed on Dec. 10, 2002, the content of which is hereby incorporated by reference herein in its entirety.

BACKGROUND OF THE INVENTION

1. Field of the Invention

The present invention relates to a mobile telecommunication terminal, and more particularly, to a mobile telecommunication terminal which can display graphic data displayed on a liquid crystal display (LCD) screen of a mobile telecommunication terminal.

2. Description of the Related Art

A mobile telecommunication terminal can be utilized to provide various functions such as a camera function and a replaying function in addition to voice communication functions. The camera function and the multimedia replaying function are more popular now that wideband services is available. A mobile telecommunication terminal may include a high resolution digital camera and a color LCD screen.

On the LCD screen of the mobile telecommunication terminal, icons provide certain information such as receiving sensitivity, battery capacity, message, bell/ vibration, etc. Certain graphic data for a menu display and video input through a camera and streaming video signals decoded by an MPEG-4 codec (coder and decoder) are also displayed.

Referring to FIG. 1, a block diagram showing a construction of a general mobile telecommunication terminal in which various video data can be displayed is provided. A general mobile telecommunication terminal comprises a central processing unit (CPU) 10; a camera module 102; an MPEG-4 video codec 103, and an LCD 104. The CPU 10 is for controlling each of the above components. The camera module 102 is for photographing videos as a digital method by using an image sensor. the MPEG-4 video codec 103 is for compressing and restoring graphic data inputted from the CPU 101, MPEG-4 streaming video data, and video data inputted from the camera module. The LCD 104 for displaying the compressed and restored data The MPEG-4 video codec 103 includes a host interface 1031, a camera interface unit 1034, a video processing unit 1032, an arbitration circuit unit 1033, a memory 1035, and an LCD interface unit 1036. The host interface 1031 is for giving and taking graphic data and control signals with the CPU 101. The camera interface unit 1034 is for receiving a digital video signal from the camera module 102.

The video processing unit 1032 is for compressing the digital video signal inputted from the camera module 102 by a standard of the MPEG-4 or restoring MPEG-4 streaming data inputted from the CPU 101. The arbitration circuit unit 1033 is for arbitrating operations of said respective devices and data processing processes. The memory 1035 is for storing video data inputted from the camera module or video data restored in the video processing unit; and an LCD interface unit 1036 for providing data and control signals to the LCD 104.

Also included are a first display layer for displaying each kind of menu and icon showing various information of the terminal, a second display layer for video data photographed through a camera module, and a third display layer for video data which have restored MPEG-4 video streaming data downloaded from a video server.

The first layer provides for display for menus, icons, and a background screen of the mobile telecommunication terminal. The graphic data is displayed on the LCD through the host interface 1031, the arbitration circuit unit 1033, and the LCD interface 1036 on the basis of data showing information of the mobile telecommunication terminal provided from the CPU 101 and a clock and a synchronization signal required to operate the mobile telecommunication terminal.

The second layer provides for display of video data inputted from the camera module and is to store video data inputted from the camera module into the memory 1035 by compressing as one image, or to display inputted video data on the LCD 104 in real time. Real time digital R, G, B (red, green, and blue) signals inputted from the camera module 102 are displayed on the LCD 104 through the camera interface 1034, the video processing unit 1032, the arbitration circuit unit 1033, and the LCD interface 1036. Also, images stored in the memory 1035 are inputted to the CPU 101.through the arbitration circuit unit 1033 and the host interface 1031, compressed into a certain form (for example, JPG), and then stored in the memory 1035.

The third layer provides for the display of video data which have restored the MPEG-4 streaming video data is to display MPEG-4 streaming video data inputted from a video server (not shown) by restoring as original video data. The inputted video data is inputted to the video processing unit 1032 from the CPU 101 through the host interface 1031 and the arbitration circuit unit 1033. At this time, the video processing unit 1032 outputs the inputted MPEG-4 streaming video data by restoring as original video data. Also, the arbitration circuit unit 1033 receives the restored data and displays on the LCD 104 through the LCD interface 1036.

The three display layers have the following problems. When graphic data such as icons and the menus and video data are to be displayed, icons (play, stop, mute, and etc.) for controlling the video data and information of the terminal (for example, receiving sensitivity, battery capacity, and etc.) are displayed on an upper side or a lower side of the LCD screen. This limits the display area for video display. Alternatively, if the data is displayed on the entire LCD screen of the mobile telecommunication terminal in order to solve said problem, then the icons and menu information of the terminal corresponding to graphic data are not displayed. A solution is needed to the above problems and to maximize the video display area.

SUMMARY OF THE INVENTION

In accordance with one embodiment, a video overlay device of a mobile telecommunication terminal comprises a multiplexer for outputting at least one of a first video data and a second video data; and a video overlay unit for overlaying at least one of the first and second video data with graphic data in accordance with a predetermined ratio. The multiplexer selectively outputs at least one of the first and second video data based on input video selection signals provided by a central processing unit (CPU).

The video overlay unit comprises a color space convert (CSC) unit for converting at least one of the first and second video data into color signals; a color look-up data structure comprising information for converting graphic data representing device information into color signals; a color palette unit for blending video data converted in the CSC unit with graphic data converted based on the information in the color look-up data structure; and a video selection unit for selectively outputting at least one of the first and second video data converted in the CSC unit, blended video and graphic data, and the graphic data converted based on the color look-up data structure.

The color palette unit blends at least one of the first and second video data with the graphic data according to the predetermined ratio. The predetermined ratio is determined based on the video blend signals, provided by the CPU. The video selection unit selectively outputs at least one of the first video data, the second video data, and the blended video and graphic data.

The first video data is provided by a camera module mounted to the mobile telecommunication terminal. The second video data comprises MPEG-4 streaming video data downloaded from a video server. The MPEG-4 streaming video data is restored using an MPEG-4 codec.

In accordance with another embodiment, a video overlay device of a mobile telecommunication terminal comprises a central processing unit (CPU); a camera module for capturing videos; a video codec for compressing and restoring streaming video data provided by the camera module; a multiplexer for selectively outputting the streaming video data provided by at least one of the camera module and the video codec; and a video overlay unit for overlaying video data provided by the multiplexer with graphic data provided by the CPU, according to a predetermined ratio to produce overlaid data.

Some embodiments comprise an LCD interface unit for providing the overlaid data to a display device or an LCD for displaying the overlaid data provided by the LCD interface unit. The multiplexer selectively outputs the streaming video based on video selection signals provided by the CPU. The video overlay unit comprises a color space converter (CSC) unit for converting the video data into color signals.

In some embodiments, the video overlay unit further comprises a color look-up data structure for converting graphic data associated with terminal related information into color signals. The video overlay unit can further comprise a color palette unit for blending video data converted in the CSC unit with graphic data converted according to the predetermined ratio.

In some embodiments, a video selection unit is included for selectively outputting at least one of the video data converted in the CSC unit, blended video and graphic data provided, by the color palette unit, and the graphic data converted based on information included in a color look-up data structure in the video overlay unit. The color palette unit blends at least one of the first and second video data with the graphic data according to the predetermined ratio provided by the CPU.

The predetermined ratio is calculated based on the video blend signals provided by the CPU. The video selection unit selectively outputs at least one of video data provided by the camera module, video data restored through the codec, the graphic data, and blended video and graphic data based on selection signals provided by the CPU.

The camera module digitally captures videos by way of an image sensor. The video codec is an MPEG-4 video codec for compressing and restoring MPEG-4 streaming video data and video data provided by the camera module.

The present invention is directed to a video overlay device of a mobile telecommunication terminal which can overlay graphic data and video data by blending graphic data displayed on an LCD screen of a terminal with videos inputted through a camera or video data restored by an MPEG-4 codec with a desired ratio.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a video blend table showing a video blend ratio according to one embodiment of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
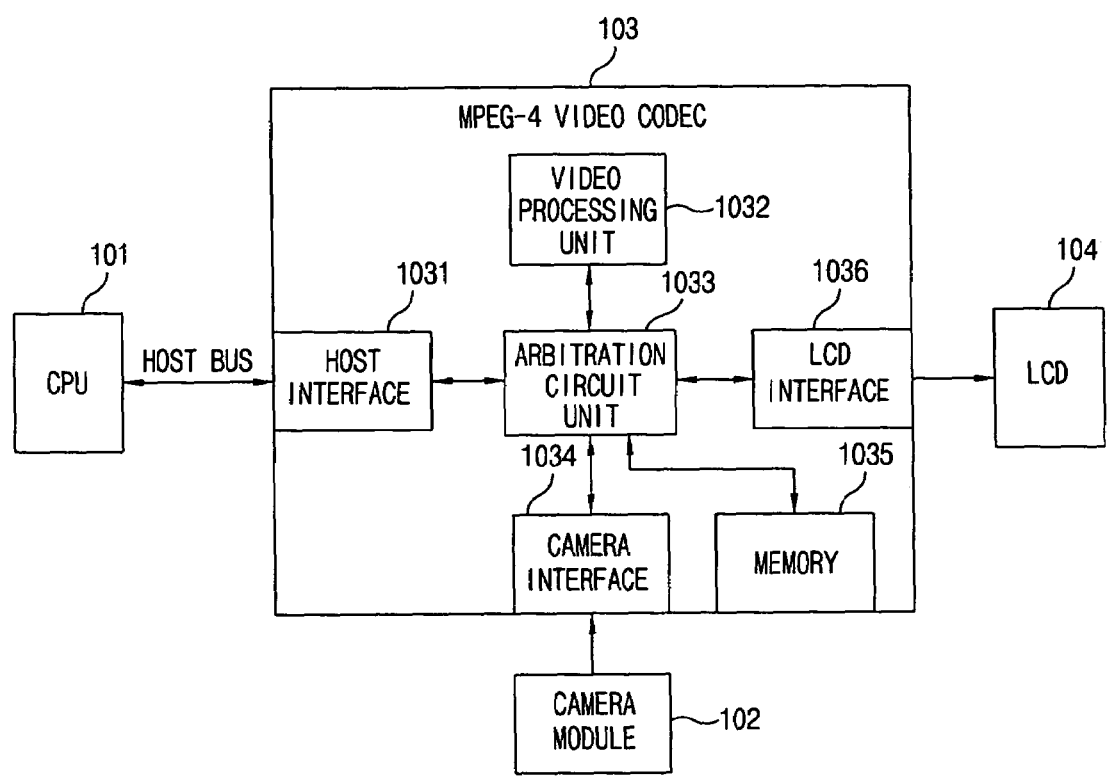
FIG. 1 is a block diagram of a mobile telecommunication terminal in which a graphic display and a video display are possible in accordance with the related art.
Figure 2:
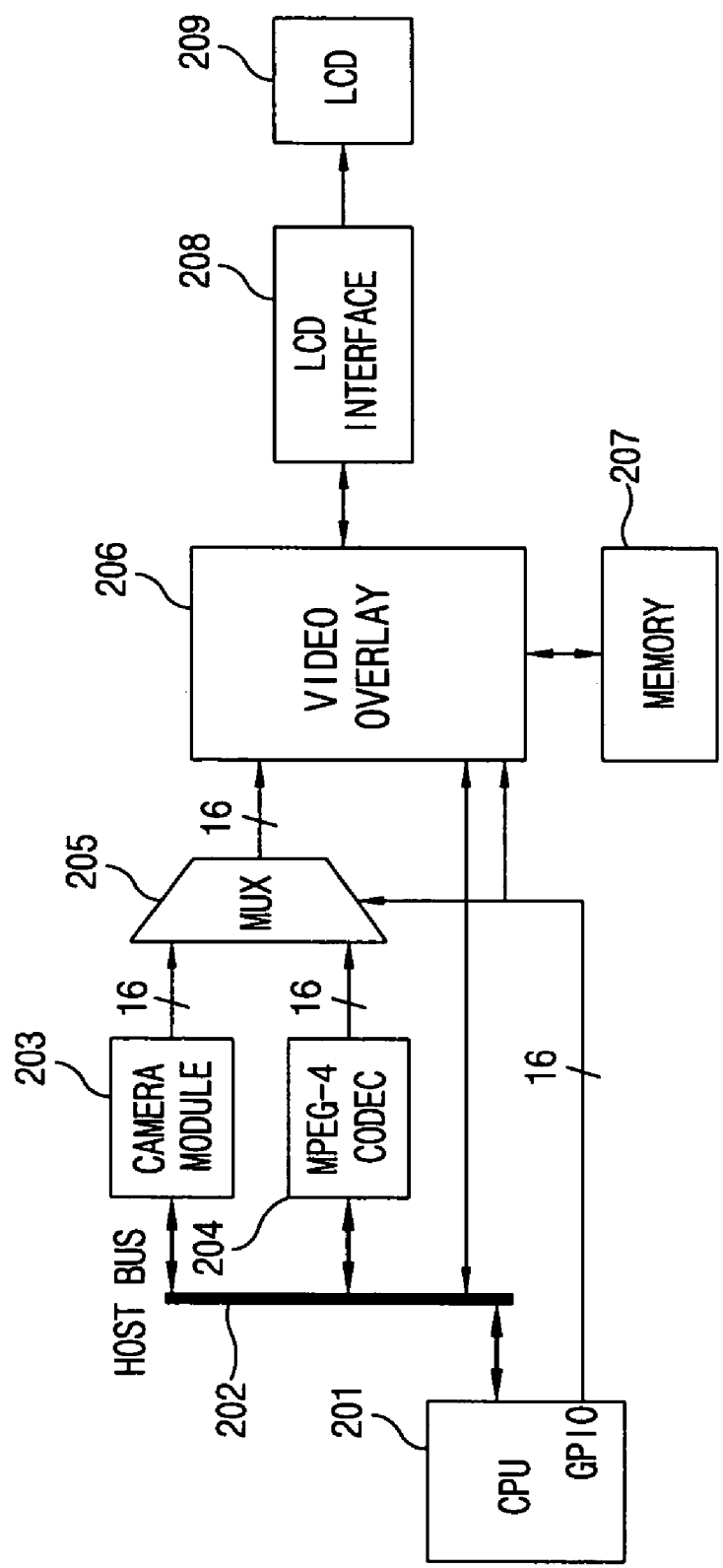
FIG. 2 is a block diagram of a mobile telecommunication terminal equipped with a video overlay device according to one embodiment of the invention.

Referring to FIG. 2, a mobile telecommunication terminal in accordance with one or more embodiments of the invention comprises a central processing unit (CPU) 201; a camera module 203; an MPEG-4 video codec 204; a multiplexer 205; a video overlay unit 206; a memory unit 207; an LCD interface unit 208; and an LCD 209. The central processing unit (CPU) 201 controls each component; the camera module 203 captures videos by using an image sensor; the MPEG-4 video codec 204 compresses and restores MPEG-4 (motion picture experts group) streaming video data and video data inputted from the camera module.

In some embodiments, the multiplexer 205 outputs video signals from the cameral module 203 and the MPEG-4 video codec 204. The video overlay unit 206 provides video data from the multiplexer 205 and graphic data from the CPU 201 with a predetermined overlay ratio. The memory unit 207 stores the overlaid data. The LCD interface unit 208 is for outputting the overlaid data to a display device. The LCD 209 is for displaying data outputted from the LCD interface unit 208.

In accordance with one embodiment, the CPU 201 controls each system component above, including the multiplexer 205, outputs graphic data showing information of the mobile telecommunication terminal, and restores the MPEG-4 streaming video data through the MPEG-4 codec.

This provides the output to the multiplexer 205. Also, videos inputted from the camera module 203 are processed by the MPEG-4 codec 204 and thereby are outputted to the multiplexer 205.

The multiplexer 205 receives video data from the camera module 203 and the MPEG04 codec 204, and outputs one video data on the basis of control signals outputted from the CPU 201. The video overlay unit 206 blends video data outputted from the multiplexer 205 and graphic data outputted from the CPU 201 with the predetermined ratio on the basis of control signals outputted from the CPU 201.

The predetermined ratio is calculated based on a basis blend table. Also, the blending video data is stored in the memory 207 or outputted to the LCD interface 208, in certain embodiments. Accordingly, the LCD interface 208 receives blending video data from the video overlay unit 206 and thereby displays the data on the LCD 209 of the mobile telecommunication terminal. Also, the LCD interface 208 outputs control signals for controlling the LCD 209 of the mobile telecommunication terminal.

Figure 3:
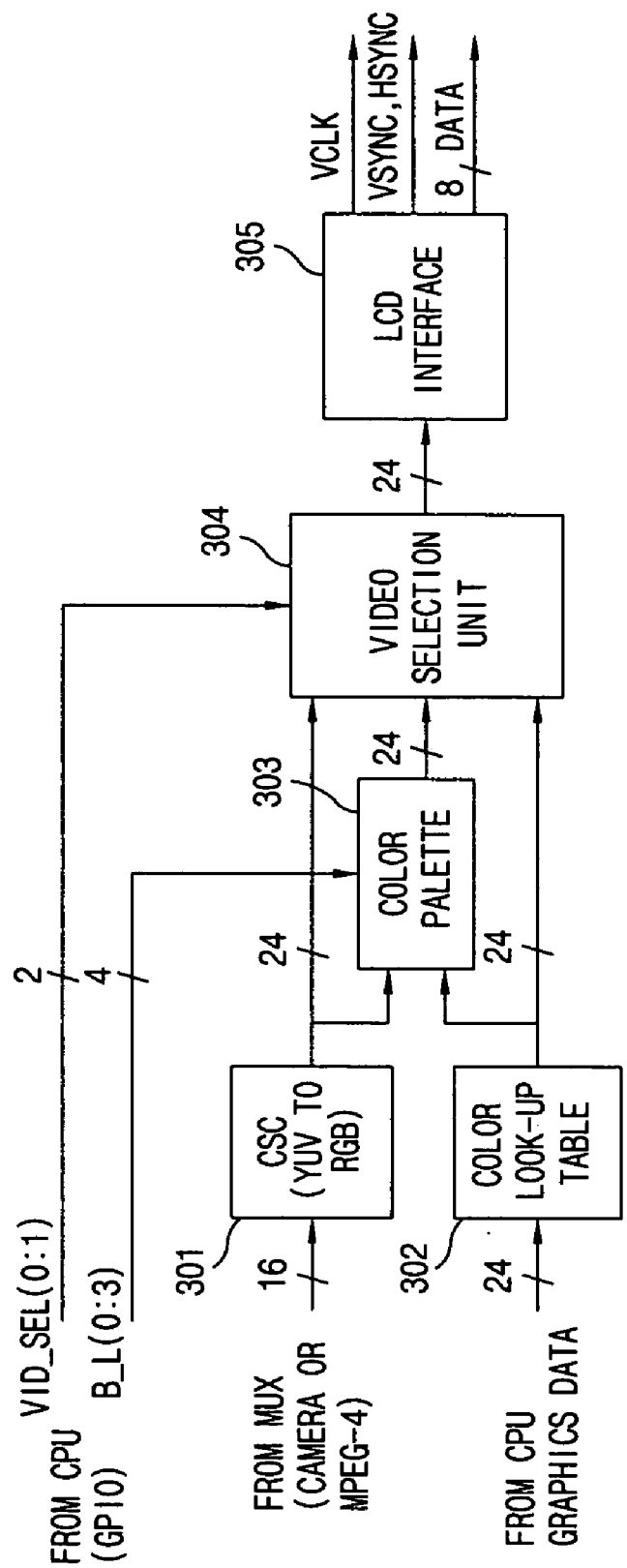
FIG. 3 is a block diagram of a minute construction of a video overlay unit according to one embodiment of the invention.

Referring to FIG. 3, the video overlay unit comprises a CSC (color space convert) unit 301; a look-up table 302; a color palette unit 303; a video selection unit 304, and an LCD interface 305. The CSC (color space convert) unit 301 converts camera video data outputted through the multiplexer 205 and restores MPEG-4 video data (16 bits) into color data (R, G, B 24 bits).

In some embodiments, the look-up table 302 is provided for receiving graphic data from the CPU 201 and thereby converting into color data (R, G, B 24 bits). Other data structures can be implemented to provide the same service. The color palette unit 303 is for blending video data outputted from the CSC unit 301 with graphic data outputted from the color look-up table 302 with a predetermined ratio. The video selection unit 304 is for selectively outputting one of the video data of the CSC unit 301, the video data of the color palette unit 303, and the graphic data of the color look-up table 302. The LCD interface 305 is for outputting data outputted from the video selection unit 304 and each kind of synchronization signal required for an LCD display.

Figures 4, 5:
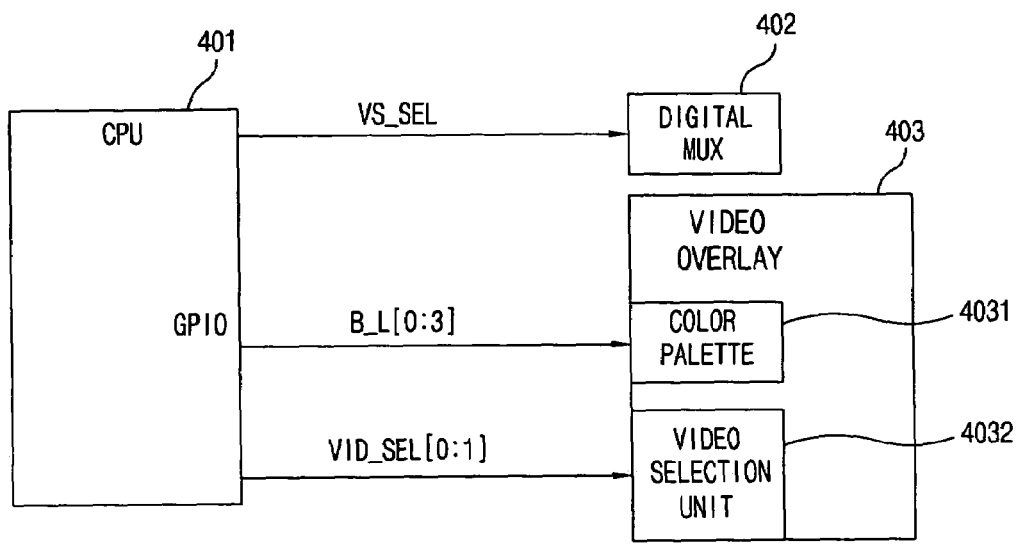
FIG. 4 is an exemplary view for explaining operation characteristics of each control signal according to one embodiment of the invention.
FIG. 5 is an exemplary view for explaining an output method of video according to one embodiment of the invention.

Referring to FIG. 4, the control signals, i.e., input video selection signals (VS_SEL), video blend signals (B_L), and output video selection signals (VID_SEL) are respectively outputted through a general purpose input output (GPIO) port of the CPU 201 in order to control the multiplexer 205, the color palette 303, and the video selection unit 304.

In one embodiment, the input video selection signals (VS_SEL) are inputted to the multiplexer 402. The multiplex selects one of video data outputted from the camera module and video data restored through the MPEG-4 thus to output. The video blend signals (B_L) are inputted to the color palette 4031 in order to control a blend ratio of the video data and the graphic data.

The output video selection signals (VID_SEL) are inputted to the video selection unit 4032. The video selection unit 4032 selectively outputs one data of the restored MPEG-4 video data, the camera video data, and the graphic data, or video data where the video data and the graphic data are blended.

Referring to FIG. 5, a method for displaying the restored MPEG-4 video data or the camera video data is provided. The multiplexer 205 receives digital video data outputted from the camera module 203 and the MPEG-4 codec 204. The multiplexer 205 selects one of video data inputted from the camera module 203 and video data inputted from the MPEG-4 codec 204.

The selection is based on the input video selection signals outputted from the CPU 201 to provide an output to the video overlay unit 206. The digital video data outputted from the camera module 203 and the MPEG-4 codec 204 is YUV (brightness, color) data (16 bits), and inputted to the CSC unit 301 thus to be converted into R, G, B data (24 bits), for example.

In certain embodiments, the video selection unit 304 selects one video data based on the output video selection signals (VID_SEL) of 2 bits inputted from the CPU 201, and outputs it to the LCD interface 208. Also, the LCD interface 208 outputs control signals of a video pixel clock (VCLK), a vertical synchronous signal (Vsync), and a horizontal synchronous signal (Hsync) and 8-bit video data (one 24-bit pixel data per 3 cycles) to the LCD 209 and thereby displays.

The color look-up table converts graphic data (16 bits) inputted from the CPU 201 into R, G, B data (24 bits). The video selection unit 304 selects the graphic data on the basis of the output video selection signals (VID_SEL) of 2 bits (0,0) inputted from the CPU 201, and outputs it to the LCD interface 208. Also, the LCD interface 208 outputs control signals of a video pixel clock (VCLK), a vertical synchronous signal (Vsync), and a horizontal synchronous signal (Hsync) and 8-bit video data (one 24-bit pixel data per 3 cycles) to the LCD 209 and thereby displays.

In one or more embodiments, the color palette unit 303 receives the restored MPEG-4 data outputted from the multiplexer 205 or data which the camera video data is converted into R, G, B data through the CSC unit 301, and receives data which graphic data outputted from the CPU 201 is converted into R, G, B data through the color look-up table 302. Advantageously, the color palette unit blends data inputted from the CSC with data inputted from the color look-up table with a predetermined ratio on the basis of the output video selection signals (VID_SEL) of 2 bits (1,0).

Referring to FIG. 6, the color palette unit 303 determines a blend ratio of the inputted data with a predetermined ratio of a predetermined video blend table on the basis of 4-bit video blend signals (B_L) outputted from the CPU 201. Accordingly, the color palette 303 blends video data inputted from the CSC 301 with graphic data inputted from the color look-up table 302 with the predetermined ratio based on the video. blend table, and outputs to the video selection unit 304.

Preferably, when a bit combination of the video blend signal (B_L) is '0,1,0,0', for example, a blend ratio of the graphic data is 100% and a blend ratio of the video data is 0%. As such, the LCD of the mobile telecommunication terminal displays the graphic data. When a bit combination of the video blend signal (B_L) is '0,1,0,1', for example, a blend ratio of the graphic data is 0% and a blend ratio of the video data is 100%. Accordingly, the LCD of the mobile telecommunication terminal displays only the video data.

In one embodiment, when a bit combination of the video blend signal (B_L) is '1,0,1,0', for example, a blend ratio of the graphic data is 25% and a blend ratio of the video data is 75%. Accordingly, the LCD of the mobile telecommunication terminal displays the graphic data and the video data in a state that the video data is a little overlaid by the graphic data.

The video selection unit 304 selects blending data of the graphic data and the video data on the basis of the output video selection signals (VID_SEL) of 2 bits (1,0) inputted from the CPU 201, and thereby outputs to the LCD interface 208. Also, the LCD interface 208 outputs control signals of a video pixel clock (VCLK), a vertical synchronous signal (Vsync), and a horizontal synchronous signal (Hsync) and 8-bit video data (one 24-bit pixel data per 3 cycles) to the LCD 209.

In accordance with one embodiment of the invention, the video overlay device of a mobile telecommunication terminal according to the present invention can overlay graphic data and video data by blending graphic data displayed on an LCD screen of the terminal with videos inputted through a camera or MPEG moving pictures with a desired ratio. The video overlay device of a mobile telecommunication terminal displays moving pictures on the entire LCD screen of the terminal and at the same time outputs each kind of control icon or icon for displaying a state of the terminal by overlaying. According to this, the user can appreciate the moving pictures in a wide screen and know information of the terminal, thereby having enhanced convenience.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A video overlay device of a mobile telecommunication terminal comprising:
    a multiplexer for outputting at least one of a first video data and a second video data; and
    a video overlay unit for overlaying at least one of the first and second video data with graphic data in accordance with a predetermined ratio,
    wherein the multiplexer selectively outputs at least one of the first and second video data based on input video selection signals provided by a central processing unit (CPU), and
    wherein the video overlay unit comprises:
    a color space convert (CSC) unit for converting at least one of the first and second video data into color signals;
    a color look-up data structure comprising information for converting graphic data representing device information into color signals;
    a color palette unit for blending video data converted in the CSC unit with graphic data converted based on the information in the color look-up data structure; and
    a video selection unit for selectively outputting at least one of the first and second video data converted in the CSC unit, blended video and graphic data, and the graphic data converted based on the color look-up data structure.

2. The device of claim 1, wherein the color palette unit blends at least one of the first and second video data with the graphic data according to the predetermined ratio.

3. The device of claim 2, wherein the predetermined ratio is determined based on the video blend signals, provided by the CPU.

4. The device of claim 2, wherein the video selection unit selectively outputs at least one of the first video data, the second video data, and the blended video and graphic data.

5. The device of claim 1, wherein the first video data is provided by a camera module mounted to the mobile telecommunication terminal.

6. The device of claim 1, wherein the second video data comprises MPEG-4 streaming video data downloaded from a video server.

7. The device of claim 6, wherein the MPEG-4 streaming video data is restored using an MPEG-4 codec.

8. A video overlay device of a mobile telecommunication terminal comprising:
    a central processing unit (CPU);
    a camera module for capturing videos;
    a video codec for compressing and restoring streaming video data provided by the camera module;
    a multiplexer for selectively outputting the streaming video data provided by at least one of the cameral module and the video codec; and
    a video overlay unit for overlaying video data provided by the multiplexer with graphic data provided by the CPU, according to a predetermined ratio to produce overlaid data,
    wherein the video overlay unit comprises:
    a color space converter (CSC) unit for converting the video data into color signals, and
    a color palette unit for blending video data converted in the CSC unit with graphic data converted according to the predetermined ratio.

9. The device of claim 8, further comprising an LCD interface unit for providing the overlaid data to a display device.

10. The device of claim 9, further comprising an LCD for displaying the overlaid data provided by the LCD interface unit.

11. The device of claim 8, wherein the multiplexer selectively outputs the streaming video based on video selection signals provided by the CPU.

12. The device of claim 8, wherein the video overlay unit further comprises:
    a video selection unit for selectively outputting at least one of the video data converted in the CSC unit, blended video and graphic data provided by the color palette unit, and the graphic data converted based on information included in a color look-up data structure in the video overlay unit.

13. The device of claim 12, wherein the video selection unit selectively outputs at least one of video data provided by the camera module, video data restored through the codec, the graphic data, and blended video and graphic data based on selection signals provided by the CPU.

14. The device of claim 8, wherein the color palette unit blends at least one of the first and second video data with the graphic data according to the predetermined ratio.

15. The device of claim 14, wherein the predetermined ratio is calculated based on the video blend signals provided by the CPU.

16. The device of The device of claim 8, wherein the camera module digitally captures videos by way of an image sensor.

17. The device of The device of claim 8, wherein the video codec is an MPEG-4 video codec for compressing and restoring MPEG-4 streaming video data and video data provided by the camera module.

18. The device of The device of claim 8, further comprises a memory unit for temporarily storing the overlaid data.

* * * * *